United States Patent Office 3,576,652
Patented Apr. 27, 1971

3,576,652
BONDING LIQUIDS FOR REFRACTORY
MATERIAL
Harry Teicher, 9512 Laguna Drive, and Ralph Marotta, 9558 Indian Meadows Drive, both of St. Louis, Mo. 63132
No Drawing. Filed July 28, 1969, Ser. No. 845,498
Int. Cl. B01j 13/00; B28b 7/34
U.S. Cl. 106—38.35          17 Claims

ABSTRACT OF THE DISCLOSURE

This invention relates to bonding liquids having a homogeneous liquid phase with colloidal silica dispersed therein. The binder liquids are admixtures of an acidic aqueous colloidal silica sol, a water miscible organic solvent (such as ethanol) and an alkyl silicate (such as ethyl polysilicate) or an admixture of an acidic organo-aqueous colloidal silica sol and an alkyl silicate. A preferred bonding liquid (stable for at least 60 days at 25° C.) contains about 15 weight percent to about 20 weight percent of silica, acid in an amount to provide a normality of 0.005 to about 0.02, about 80 weight percent to about 85 weight percent of ethanol, and less than 1 weight percent of water.

BACKGROUND OF THE INVENTION

Field of the invention

This invention relates to novel binder liquids for investment metal casting. More specifically, it relates to combinations of acidic aqueous colloidal silica sols or acidic organo-aqueous colloidal silica sols and alkyl silicates useful as binder liquids or bonding liquids for refractory materials. The binder liquids have homogeneous liquid phases with colloidal silica dispersed therein.

Description of the prior art

It is well known to utilize hydrolyzed ethyl silicates made by acid catalysis of ethyl silicate for the production of refractory moulds. However, some moulds produced employing these binders are not always satisfactory. For example, the fired tensile strength of some moulds is such that they are not suitable for casting large metal parts because of the weight of the metal involved. Others require firing at high temperatures for long time periods resulting in high processing costs and high furnace refractory costs. Still others require long time periods to vaporize the organic solvent present. Finally, some have high thermal expansion and permanent expansion properties which are disadvantageous in precision casting.

One attempt in the prior art to overcome the disadvantage of moulds having inferior tensile strength and to provide moulds of increased tensile strength is disclosed in U.S. Pat. 2,842,445. This patent discloses a combination of ethyl silicate and an acidified colloidal silica sol useful as a bonding liquid for refractory materials. The ethyl silicate is hydrolyzed by acidified colloidal silica sol having a normality of about 0.25 to about 1.2. The bonding liquids disclosed however, must be freshly prepared and immediately used in investment casting processes as they are not stable for any extended time periods. These binders, therefore, would not be useful in foundries which do not have the facilities to prepare binders or which do not wish to prepare binders before use.

A bonding liquid that overcomes the above-mentioned disadvantages of commercially available hydrolyzed ethyl silicates and is stable for a period of at least 2 months would, therefore, be an advancement in the art.

OBJECTS

It is an object of this invention to provide a bonding liquid useful for making moulds, mould linings to be used in investment casting or other kinds of metal casting procedures.

It is another object of this invention to provide a bonding liquid for making moulds or mould linings and which liquid is stable for extended time periods.

It is another object of this invention to provide moulds having improved functional properties prepared from the bonding liquids of this invention.

Other objects will be apparent from the following more complete description of this invention and the appended claims.

SUMMARY OF THE INVENTION

Briefly, one embodiment of the present invention provides an essentially anhydrous organic liquid having a homogeneous liquid phase with colloidal silica dispersed therein resulting from the combining of an alkyl silicate such as ethyl polysilicate and an acidic aqueous colloidal silica sol in the presence of a water-miscible organic solvent, and which possesses none of the above-mentioned disadvantages, is stable toward gelation or settling for at least 2 months and is especially suitable as a bonding liquid for investment casting.

Another embodiment of the present invention provides an essentially anhydrous organic liquid having a homogeneous liquid phase with colloidal silica dispersed therein resulting from an admixture of an acidic organo-aqueous colloidal silica sol and an alkyl silicate which is stable toward gelation or settling for at least two months, and is useful as a bonding liquid for investment casting.

In the embodiments, the alkyl silicate is hydrolyzed in an aqueous organic solvent medium under very carefully controlled conditions (hereinafter defined) with respect to the starting materials.

The bonding liquids of the present invention are stable for at least 2 months at 25° C. Moreover, it is unexpected that these bonding liquids containing about 15 to about 20% by weight of silica may be used in the formation of moulds or mould linings for use in investment casting processes with results as good as obtained by the use of hydrolyzed ethyl silicates containing about 24% by weight of silica. In addition, moulds produced employing the novel bonding liquid of the present invention exhibit increased fired tensile strength and green strength as compared to those obtained using hydrolyzed ethyl silicate. Moreover, the time and temperature for mould firing is reduced; consequently, furnace refractory costs and processing times are reduced. Finally, there is less permanent expansion of the moulds during firing, a very important property in precision metal casting. The bonding liquid can also be used to make ceramic cores or other ceramic compositions to be used in all kinds of metal casting procedures.

Although the reason or reasons for the advantages of the binder liquids of the present invention are not known with certainty, it is believed that these advantages result because of different silica particles sizes present in the binder liquid. It is believed there is some type of interaction that results in a superior product. However, applicant does not wish to be bound by any theory or theories.

DETAILED DESCRIPTION OF THE INVENTION

In general, in preparing the binder liquids having a homogeneous liquid phase and colloidal silica dispersed therein in accordance with the present invention, first a water-miscible organic solvent is added to an acidic aqueous colloidal silica sol, then an alkyl silicate such as ethyl polysilicate is added.

In another procedure, an acidic organo-aqueous silica sol and an alkyl silicate are combined. Both of these processes result in the alkyl silicate being hydrolyzed by the water from the colloidal silica sol and from the other starting materials.

As pointed out previously herein, the alkyl silicate may be a liquid silicate having two —OR groups attached to a silicon atom which is also attached to at least one other oxygen atom, and wherein R is an alkyl group. A particularly suitable class of compounds are those having the structural formula:

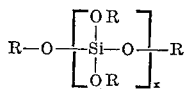

where R is an alkyl radical having from 1 to 4 carbon atoms and $x$ is a number from 1 to 10, including such compounds as tetramethyl orthosilicate, tetraethyl orthosilicate, tetrapropyl orthosilicate, tetrabutyl orthosilicate and the like and the various polymers thereof containing 2 to 10 —Si—O— units. The preferred compound of this class is tetraethyl orthosilicate. Preferred polymers include polysilicates having from 2–10 —Si—O— groups, mixtures thereof and mixtures thereof with the monomer tetraethyl orthosilicate.

These alkyl silicates contain about 20 weight percent to about 45 weight percent, preferably from about 38 weight percent to about 42 weight percent, based on the total weight of alkyl silicate, of silica ($SiO_2$) with the balance being alkoxy groups or oxygen or both as set forth in the above formula. In the case of polymers, there is less than 1% by weight, based on the weight of the alkyl silicate, of free alcohol.

A particularly preferred alkyl silicate is a liquid polyethyl silicate containing 90 weight percent to about 95 weight percent of polymers having 5 to 6 —Si—O— groups per molecule with the balance being made up of other species having 1 to 8 —Si—O— groups per molecule. Such polysilicate contains about 38 to about 42 weight percent of silica ($SiO_2$) with the balance being made up of ethoxy groups, oxygen and less than about 1% free alcohol. These silicates are essentially neutral.

The alkyl silicates are used in an amount to provide about 56 weight percent to about 82 weight percent, preferably from about 56 weight percent to about 70 weight percent of the total silica content in the bonding liquid. For example, if the bonding liquid has a total silica concentration of about 20 weight percent, based on the total weight of the bonding liquid, one of the aforementioned alkyl silicate compositions having a silica concentration of 41 weight percent, based on the total weight of the alkyl silicate, is used in an amount of about 34 weight percent, based on the total weight of the bonding liquid.

In accordance with this invention, acidic aqueous colloidal silica sols are employed in the novel bonding liquid. These sols have a silica concentration of at least 39 weight percent, based on the total weight of the sol, and a pH from about 0.5 to about 1.5 at 25° C.

Generally, these acidic aqueous colloidal silica sols have a silica concentration of from about 39 weight percent to about 60 weight percent, a water concentration of from about 40 weight percent to about 61 weight percent, both concentrations based on the total weight of the sol, and an ultimate particle size of less than 250 millimicrons, generally in the range of 5 to 200 millimicrons, usually less than 100 millimicrons.

A more preferred acidic aqueous colloidal silica sol is one having the following characteristics:

(1) a pH of from about 0.5 to about 1.5 at 25° C.;
(2) a silica concentration of about 40 weight percent to about 55 weight percent, based on the weight of the sol;
(3) a water concentration of about 45 weight percent to about 60 weight percent, based on the weight of the sol;
(4) an ultimate particle size of from about 5 millimicrons to about 50 millimicrons; and
(5) a normality of about 0.05 to about 0.23.

The amount of acidic aqueous colloidal silica sol used in the bonding liquids of the present invention is an amount sufficient to provide from about 18 weight percent to about 44 weight percent, and preferably from about 19 weight percent to about 33 weight percent of the total silica content in the bonding liquids. For example, if the bonding liquid has a total silica concentration of about 20% by weight based on the total weight of the bonding liquid, one of the aforementioned aqueous silica sols having a concentration of about 45% by weight based on the total weight of the sol, would be used in an amount of about 13 weight percent, based on the total weight of the bonding liquid. In another example, if about 20% by weight of total silica is present in the bonding liquid, one of the aforementioned aqueous silica sols having a 50 weight percent silica concentration, based on the total weight of the sol, would be used in an amount of about 10% by weight based on the total weight of the bonding liquid.

The acidic aqueous silica sols may be prepared by acidifying an alkaline aqueous colloidal silica sol having a silica concentration of at least 39 weight percent, based on the total weight of the alkaline aqueous colloidal silica sol, and a pH above 7, preferably between 8.0 and 11.0. The alkaline sol may be acidified by employing a mineral acid or using a cation exchange resin in the acid form.

The alkali aqueous colloidal silica sols may be prepared in a variety of well-known ways. Thus, they may be prepared from aqueous sodium silicate solutions by treatment with cation exchange resins operating on the hydrogen cycle thereby reducing the sodium to $SiO_2$ ratio of the original sodium silicate solution. Such procedures are described in general and in greater detail in U.S. Pat. Nos. 2,577,484 and 2,577,485 to Joseph M. Rule granted Dec. 4, 1951; U.S. Pat. No. 2,929,790 to Raymond Reuter granted Dec. 7, 1945; and U.S. Pat. No. 3,374,180 to Ralph Marotta granted Mar. 19, 1968. Moreover, the alkaline aqueous colloidal silica sols may be prepared by removing the organic diluent from an alkaline organo-aqueous colloidal silica sol as described in U.S. Pat. No. 3,342,748 to Ralph Marotta granted Sept. 19, 1967.

Additional alkaline aqueous colloidal silica sols which may be utilized in the novel compositions of the present invention may be prepared by the process disclosed in U.S. Pat. No. 2,750,345. In order to avoid the enlargement of the present specification, the alkaline aqueous colloidal silica sol and the processes for making said sols set forth in the aforementioned patents should all be considered as incorporated herein by reference.

All of the aqueous colloidal silica sols prepared by the procedures referred to in the preceding paragraphs may be used in the compositions of this invention providing they have a silica concentration of at least 39 weight percent. All of these sols are slightly alkaline, having a pH above 7 and generally, in the range of about 8.0 to 11.0, preferably about 8.5 to 10.5, and having an $SiO_2$ to $M_2O$ mol ratio, wherein M is an alkali metal such as sodium or ammonium in the range of about 10:1 to 500:1, and usually in the range of about 80:1 to about 300:1. These silica sols are also stable, in that they remain fluid, that is, do not gel for periods of about two months or longer at 25° C. at silica concentrations of at least 39 weight percent. However, depending upon the particular procedure used, stable silica sols up to 60 weight percent of silica can be prepared. The ultimate silica particles in the sol appear substantially as spheroids on an electron micrograph prepared by diluting the sol to about 0.1% silica concentration and observing the particles at about 50,000 diameter magnification. Ideally, the particles are substantially all in the form of such spheroids. The silica sols which may be generally used in the compositions of the present invention have an average ultimate particle size of less than 250 millimicrons and generally in the range of about 5 to 200 millimicrons. The preferred sols have an average ultimate particle size below 100 millimicrons, preferably 5–50 millimicrons. The sols contain from about 39 weight percent to about 61 weight percent of water, preferably from about 40 weight percent to about 55 weight percent of colloidal silica based on the weight of the sols. These sols, depending on the way they are prepared, may contain relatively small amounts of water-soluble inorganic salts, usually sodium sulfate or sodium chloride, or both, which originate from the raw materials, for example, sodium silicate or sulfuric acid, employed in their manufacture. Usually, such sols will contain less than 1.5 weight percent, for example, in the range of 0.2 to 1.5 weight percent of such inorganic salts and, in most instances the sols prepared from sodium silicate and cation exchange resins will contain less than 1 weight percent, for example, in the range of 0.1 to 1 weight percent of such inorganic salts.

A particularly preferred stable alkaline aqueous colloidal silica sol is one having the following characteristics:

(1) a pH of about 9 to about 10 at 25° C.;
(2) a silica to sodium oxide (e.g. $Na_2O$) ratio of about 90:1 to about 175:1;
(3) a stability toward gelation for a period of at least 2 months at 25° C.;
(4) a silica concentration of about 40 weight percent to about 50 weight percent based on the weight of the sol;
(5) ultimate particle size of about 5 to about 50 millimicrons;
(6) a water concentration of from about 45 weight percent to about 60 weight percent, based on the weight of the sol; and
(7) an inorganic water-soluble inorganic salt concentration of less than about 0.2 weight percent to about 0.5 weight percent based on the weight of the sol.

The aqueous silica sols are acidified in accordance with this invention by the addition of a mineral acid. Such mineral acids include hydrochloric acid, sulfuric acid and nitric acid. It is preferred to use either hydrochloric acid or sulfuric acid. The sols are acidified with one of the above mentioned acids such that the sols have a normality in the range of about 0.05 to about 0.23. The above mentioned mineral acids are present in the bonding liquid in an amount to provide, in addition to the stated normalities for the silica sols, a normality of the bonding liquid in the range of about 0.003 to about 0.05, preferably from about 0.005 to about 0.02. The free acid in the bonding liquid may be determined by titration techniques. For example, a 25 milliliter sample of the bonding liquid is diluted with 75 milliliters of ethanol. Then an anhydrous alcoholic solution of aurin indicator having a concentration of 0.15 gram per 100 milliliters is added and titrated with a 0.01 normal alcoholic solution of KOH.

The acidic organo-aqueous colloidal silica sols that may be used in the practice of this invention have a silica concentration of about 2 weight percent to about 17 weight percent, preferably from about 4 weight percent to about 10 weight percent; a water miscible organic solvent (hereinafter set forth) concentration of about 57 weight percent to about 96 weight percent, preferably from about 75 weight percent to about 90 weight percent; a water concentration of from about 2 weight percent to about 41 weight percent, preferably from about 6 weight percent to about 21 weight percent, all concentrations based on the total weight of the organo aqueous colloidal silica sol. These sols have an ultimate particle size of less than 250 millimicrons, generally in the range of 5 to 200 millimicrons, usually less than 100 millimicrons and have a normality of from about 0.005 to about 0.023.

These sols, depending on the way they are prepared, may contain relatively small amounts of water soluble inorganic salts, usually sodium sulfate or sodium chloride, or both, which originate from the raw materials, for example, sodium silicate or sulfuric acid employed in their manufacture.

The amount of acidic organo-aqueous colloidal silica sol used in the bonding liquids of the present invention is an amount sufficient to provide from about 18 weight percent to about 44 weight percent, preferably from about 19 weight percent to about 33 weight percent of the total silica in the bonding liquid and from about 38 weight percent to about 70 weight percent, preferably from about 50 weight percent to about 60 weight percent, of water miscible organic solvent, based on the total weight of the bonding liquid.

The acidic organo-aqueous colloidal silica sols may be prepared by adding an appropriate amount of a mineral acid to an appropriate amount of a water miscible organic solvent (hereinafter to be set forth) and then adding this to one of the alkaline aqueous colloidal silica sols hereinbefore mentioned. When utilizing one of the aforementioned mineral acids such as hydrochloric or sulfuric, they are used in an amount to provide a normality in the range of about 0.005 to about 0.023.

The organic solvents used with the alkyl silicates and the acidic aqueous colloidal silica sols and as one of the components in the acidic organo-aqueous colloidal silica sols are water miscible. Such solvents include water-miscible alcohols having from 1 to 4 carbon atoms and water-miscible ketones. Illustrative alcohols include methyl alcohol, ethyl alcohol and isopropyl alcohol. An illustrative ketone is acetone.

It is preferred to use organic liquids that are essentially anhydrous prior to incorporation into the sol or bonding liquid since free water contributes to the instability of the binder liquids. Preferred water-miscible organic solvents are anhydrous ethanol and anhydrous isopropanol.

The amount of organic solvent used in this invention is an amount of from about 38 weight percent to about 70 weight percent, preferably from about 50 weight percent to about 60 weight percent, based on the total weight of the bonding liquid.

Since some alcohol is generated during hydrolysis, the total amount of organic solvent present, i.e., original solvent added plus alcohol generated during hydrolysis, in the bonding liquid will be an amount of from about 75 weight percent to about 90 weight percent, preferably from about 80 weight percent to about 85 weight percent, based on the total weight of the bonding liquid.

The bonding liquids of the present invention have a homogeneous liquid phase and silica dispersed therein in an amount of from about 10 weight percent to about 25 weight percent, preferably from about 15 weight percent to about 20 weight percent, based on the total weight of the bonding liquid. The bonding liquid is essentially anhydrous, that is, water is present in an amount less than 5 weight percent, preferably less than 1 weight percent, based on the total weight of the bonding liquid.

By controlling the mole ratio of water (available from the silica sols and other starting materials) to (—Si—O—)$_x$ units per molecule of the alkyl silicate, wherein $x$ is a number from 1 to 10, an essentially anhydrous product is obtained. This mole ratio of water to (—Si—O—)$_x$ units per molecule of the alkyl silicate is from about 0.6:1 to about 1.7:1. A preferred mole ratio is 1.67:1.

The average surface area of the silica in the bonding liquids is from about 800 to about 1200 sq. meters/gram, this is determined by titrating with sodium hydroxide according to the procedure described in an article in Anal. Chem., 28, 1981 (1956) which is incorporated herein by reference. Electron microscopy techniques may be employed to observe the different sizes of the silica particles derived from the colloidal silica sol and the hydrolyzed ethyl silicate. The particles from the sol will be larger. The surface area of the silica in the colloidal silica sol is from about 60 to about 400 sq. meters/gram, preferably from about 60 to about 160 sq. meters/gram. The surface area of the silica from the hydrolyzed alkyl silicate is about 1400 sq. meters/gram.

It is critical that the above mentioned materials are used in the stated amounts or bonding liquids that are unstable or do not have sufficient strength to be suitable as binders for refractory materials are produced. For example, if sufficient acid is not present, unhydrolyzed alkyl silicate will remain. This residual silicate may volatilize when moulds are fired and consequently, this source of silica will not be available for bonding action. On the other hand, if too much acid is present, more base will be required to gel the bonding liquid at the time of use, which may weaken the moulds formed from such liquids. Likewise, if sufficient water is not available from the colloidal silica sol, incomplete hydrolysis of the ethyl alkyl silicate will result, which may volatilize when moulds are fired as mentioned above. If excess water is present in the bonding liquid, the bonding liquid may gel in a short period of time or become so viscous that it is not suitable for use in making refractory moulds. Additionally, if too much silica is present in the bonding liquid, the liquid will gel in a short period of time. On the other hand, if insufficient silica is present in the bonding liquid, the strength of moulds formed from the liquid (plus refractory) will not be suitable for large castings. Finally, if insufficient solvent is present, there is an immediate gelation of precipitation of the silica.

Preferred bonding liquid compositions, for example, are prepared from the following ingredients:

(A) An acidic aqueous colloidal silica sol having a silica concentration of about 40 weight percent to about 55 weight percent, a water concentration of about 45 weight percent to about 60 weight percent, both concentrations based on the weight of the sol; the sol being present in an amount to provide from about 19 weight percent to about 33 weight percent of the silica in the bonding liquid; the acidic aqueous colloidal silica sol is obtained by acidifying an alkaline aqueous colloidal silica sol, the sol before acidification having a pH of from about 8.5 to about 10.5; a silica to sodium oxide ratio of from about 80:1 to about 300:1; a stability towards gelation for a period of at least 2 months at 25° C.; an ultimate particle size of about 5 millimicrons to about 200 millimicrons, a surface area of 60 sq. meters/gram to 160 sq. meters/gram and an inorganic salt concentration of less than 0.1–1 weight percent based on the weight of the alkaline sol. The sols are acidified with either hydrochloric or sulfuric acid utilized in an amount to provide a normality of such aqueous acidic colloidal silica sols of from about 0.05 to about 0.23.

(B) Anhydrous ethanol utilized as the water-miscible organic solvent in an amount of from about 50 weight percent to about 60 weight percent based on the total weight of the bonding liquid;

(C) A liquid ethyl polysilicate containing 90 weight percent to about 95 weight percent of polymers having 5 to 6 —Si—O— groups per molecule with the balance being made up of other species having 1 to 8 —Si—O— groups per molecule. Such silicate contains about 38 weight percent to about 42 weight percent, based on the total weight of the silicate, of silica with the balance being made up of ethoxy groups, oxygen, and less than 1% free alcohol. This silicate is essentially neutral, has a surface area of 1400 sq. meters/gram when completely hydrolyzed, and is present in the bonding liquid in an amount to provide from about 56 weight percent to about 70 weight percent of the total silica in the bonding liquid.

The resultant bonding liquids are stable towards gelation or settling for at least 60 days at a temperature of 25° C., contain silica in an amount of from about 15 weight percent to about 20 weight percent based on the total weight of the bonding liquid, contain sufficient acid to provide a normality of about 0.005 to about 0.02, contain ethyl alcohol in an amount of from about 80 weight percent to about 85 weight percent, based on the total weight of the bonding liquid, contain less than about 1 weight percent of water based on the total weight of the bonding liquid and have an average silica surface area of from about 800 to about 1200 sq. meters/gram.

The novel bonding liquids or binder liquids of the present invention, as described hereinbefore, are prepared by intimately mixing the starting materials hereinbefore set forth. For example, an alkaline aqueous colloidal silica sol is mixed with a mineral acid to form an acidic aqueous colloidal silica sol. A water miscible organic solvent is then added with intimate mixing to this sol. Next, the alkyl silicate is added. It takes about one to two hours for the alkyl silicate to undergo hydrolysis, and preferably the mixture is agitated during this period. In another example, an acidic organo-aqueous silica sol is combined with an alkyl silicate. In still another example, a mineral acid is intimately mixed with a water miscible organic solvent. Next, this mixture is combined with an alkaline aqueous colloidal silica sol. Then an alkyl silicate is added. As mentioned before, it is preferred to agitate the mixture while hydrolysis is taking place. The following examples are intended to illustrate the present invention but not to limit the scope thereof, parts and percentages being by weight unless otherwise specified.

EXAMPLE I

Bonding liquids of the present invention are prepared in the following manner. First, acid (as specified in Table I–A below) is added to various stable alkaline aqueous colloidal silica sols (defined after Table I–A) in a suitable mixer and mixed for about 5 to 10 minutes. Next, ethanol (in amounts set forth in Table I–A) is charged into the mixer and mixed for an additional 5 to 10 minutes. Finally, ethyl polysilicate (in amounts set forth in Table I–A) containing 90 weight percent to about 95 weight percent of polymers having 5 to 6 —Si—O— groups per molecule, the balance being made up of other species having 1 to 8 —Si—O— groups per molecule is added and mixed for an additional 15 minutes. Such silicate contains about 41 weight percent of silica, based on the total weight of the alkyl silicate with the balance being made up of alkoxy groups, oxygen, and less than 1% free alcohol, essentially neutral and has a specific gravity at 15.5° C. of 1.07.

After the addition of ethyl polysilicate, the temperature of the mixture is about 25 to 28° C. As mixing is continued, the temperature rises to a maximum of about 38 to 40° C. in about 1½ to 2 hours, during which time hydrolysis takes place. After the maximum temperature occurs, the binder mixture is ready for use.

The above procedure was followed to prepare each of the bonding liquids of the present invention listed in Table I–A below. Additionally, there are listed in Table I–A the amounts and percentages of the starting materials, the amounts and percentages of $SiO_2$ in the final product, the percentage of $SiO_2$ from the silica sol, the percent of $SiO_2$ from the ethyl polysilicate, the days to gelation or settling and the surface area.

TABLE I-A.—BONDING LIQUIDS OF PRESENT INVENTION

| Bonding liquids | Aqueous silica sol, g. | Percent | Ethyl polysilicate, 41% SiO2 g. | Ethyl polysilicate, 41% SiO2 Percent | Acid 37% HCl, g. | Acid 37% H2SO4, g. | Normality of acidified silica sol | Ethanol, anhydrous, g. | Percent | Final percent SiO2 | Percent SiO2 in final product from sol | Percent SiO2 in final product from ethyl polysilicate | Surface area, sq. meters/gram | Days to gelation or settling |
|---|---|---|---|---|---|---|---|---|---|---|---|---|---|---|
| 1 | a423.0 | 13.21 | 1,098.0 | 34.28 | 8.25 | | 0.23 | 1,674.0 | 52.26 | 19.5 | 29.8 | 70.2 | 1,033 | 125 |
| 2 | b313.0 | 9.83 | 1,178.0 | 36.99 | 8.25 | | 0.17 | 1,685.0 | 52.92 | 19.6 | 24.6 | 75.4 | 1,081 | >365 |
| 3 | a24,094.0 | 13.19 | 62,962.0 | 34.47 | | 600.0 | 0.18 | 95,011.0 | 52.01 | 20.30 | 29.2 | 70.8 | 961 | 150 |
| 4 | a24,154.0 | 13.27 | 62,370.0 | 34.27 | 454.0 | | 0.20 | 95,011.0 | 52.21 | 20.02 | 29.8 | 70.2 | 874 | 134 |
| 5 | a8.67 | 12.09 | 34.3 | 47.82 | | 0.23 | 0.11 | 28.53 | 39.77 | 25.0 | 21.2 | 78.8 | 1,134 | >104 | a A pH of about 9.3, an SiO2 to Na2O ratio of about 145, a stability towards gelation for a period of at least 2 months at 25° C., a silica concentration of about 44.5 weight percent based on the total weight of the sol, an ultimate particle size of about 16 millimicrons, a water concentration of about 55 weight percent based on the total weight of the sol, and an inorganic salt concentration of about 0.24 weight percent based on the total weight of the sol.

b A pH of about 9.8, an SiO2 to Na2O ratio of about 110, a stability towards gelation for a period of at least 2 months at 25° C., a silica concentration of about 49 weight percent based on the total weight of the sol, an ultimate particle size of about 25 millimicrons, a water concentration of about 50 weight percent based on the total weight of the sol, and an inorganic salt concentration of about 0.25 weight percent based on the total weight of the sol.

As can be seen from the results in Table I–A, compositions of the present invention, that bonding liquids Nos. 1–5, have the aqueous silica sol alcohol ethyl polysilicate and acid present in amounts within the range specified herein, and are stable for at least 2 months at 25° C. It is very critical that the ranges specified herein be achieved, otherwise, the binders are not stable for 2 months.

In contrast to this, 3 bonding liquids Nos. 6–8 listed in Table I–B below were prepared in accordance with U.S. Pat. 2,842,445 utilizing the materials and amounts thereof specified in Table I–B. Also listed in Table I–B are the amounts and percentages of $SiO_2$ in the final product, the percentage of $SiO_2$ from the silica sol, the percentage of $SiO_2$ from the polyethyl silicate and the days to gelation or settling.

From the data in Table I–C, it can be seen that the bonding liquids having insufficient amounts of ethyl alcohol or an excess of total silica in the bonding liquid immediately settle after preparation.

EXAMPLE II

The green strength and the fired tensile strength, thermal expansion properties and gas evolution properties of various moulds prepared using a blend of zircon refractory and each of the bonding liquids (1–5) prepared in Example I are determined. The green strength in each instance and the fired tensile strength in each instance is improved. The moulds in each instance also exhibited improved thermal expansion properties and gas evolution properties.

TABLE I-B.—PRIOR ART BONDING LIQUIDS

| | Aqueous silica sol, g. | Percent | Ethyl polysilicate, 41% SiO2 g. | Ethyl polysilicate, 41% SiO2 Percent | Acid, 37% HCl, g. | Normality of acidified silica sol | Ethanol, 90.3%, g. | Percent | Final percent SiO2 | Percent SiO2 in final product from sol | Percent SiO2 in final product from ethyl polysilicate | Days to gelation or settling |
|---|---|---|---|---|---|---|---|---|---|---|---|---|
| Bonding liquids: | | | | | | | | | | | | |
| 6 | c28.4 | 13.42 | 152.0 | 71.83 | 2.36 | 0.49 | 28.8 | 12.3 | 31.5 | 6.4 | 93.6 | <1 |
| 7 | d31.2 | 15.42 | 140.0 | 69.18 | 2.36 | 0.89 | 28.8 | 12.8 | 33.0 | 14.0 | 86.0 | <1 |
| 8 | a8,100.0 | 12.34 | 48.5 | 73.35 | 354.0 | 0.40 | 9,042.0 | 12.4 | 33.9 | 11.0 | 89.0 | <1 | c A pH of about 10, an SiO2 to Na2O ratio of about 90, a stability towards gelation for a period of at least 2 months at 25° C., a silica concentration of about 15 weight percent based on the total weight of the sol, an ultimate particle size of about 150 millimicrons, a water concentration of about 85 weight percent based on the total weight of the sol, and an inorganic salt concentration of about 0.1 weight percent based on the total weight of the sol.

d A pH of about 10, an SiO2 to Na2O ratio of about 90, a stability towards gelation for a period of at least 2 months at 25° C., a silica concentration of about 30 weight percent based on the total weight of the sol, an ultimate particle size of about 14 millimicrons, a water concentration of about 70 weight percent based on the total weight of the sol, and an inorganic salt concentration of about 0.08 weight percent based on the total weight of the sol.

From the data in Table I–B, it can be seen that the prior art binder liquids are stable for less than 24 hours. The reason for this stability is not known but it should be noted that these binder liquids have a higher percentage of silica in the final product, i.e., about 30 weight percent and a lower alcohol content, i.e., less than 13 weight percent than the bonding liquids of the present invention.

In Table I–C are listed 2 bonding liquids Nos. 9 and 10 prepared in the same manner as bonding liquids Nos. 1–5, but insufficient or excess starting materials as specified in Table I–C were used. In addition to the starting materials, there are listed in Table I–C the amounts and percentages of $SiO_2$ in the final product, the percentage of $SiO_2$ from the silica sol, the percentage of $SiO_2$ from polyethyl silicate and the days to gelation or settling.

EXAMPLE III

Binder liquids of the present invention are prepared in the following manner:

0.34 gram of 37% (by weight) sulfuric acid are added to 13.3 grams of an alkaline aqueous colloidal silica sol, the same sol (a) defined after Table I–A, and mixed for about 7 minutes. Next, 52.3 grams of anhydrous propanol are charged into the mixer and mixed for an additional 10 minutes. Finally, 34.3 grams of liquid ethyl polysilicate, the same as utilized in Example I, is charged into the mixer and mixed for an additional 15 minutes. After addition of the silicate, the temperature of the mix is about 25 to 28° C., and as mixing is continued the temperature rises to about 38° C. to about 40° C. in

TABLE I-C.—BONDING LIQUIDS USING COMPONENTS IN EXCESS OR INSUFFICIENT AMOUNTS

| Bonding liquids | Aqueous silica sol. g. | Percent | Ethyl polysilicate 41% SiO2 g. | Ethyl polysilicate 41% SiO2 percent | Acid, 37% H2SO4, g. | Normality of acidified silica sol | Ethanol anhydrous, g. | Percent | Final percent SiO2 | Percent SiO2 in final product from sol | Percent SiO2 in final product from ethyl polysilicate | Days to gelation or settling |
|---|---|---|---|---|---|---|---|---|---|---|---|---|
| 9 | a8.67 | 13.3 | 34.3 | 52.61 | 0.23 | 0.11 | 22.0 | 33.70 | 27.5 | 21.7 | 78.3 | Immediate. |
| 10 | a8.67 | 14.5 | 34.3 | 57.40 | 0.23 | 0.11 | 16.56 | 27.8 | 30.0 | 21.7 | 78.3 | Do. |

See footnotes on Table I–A.

about 1½ hours to 2 hours during which time hydrolysis of the silicate took place. After the maximum temperature occurs, the bonding liquid is cooled and is ready for use.

Equally good results are obtained when methanol, and acetone are substituted in the same proportions for anhydrous propanol. Equally good results are obtained by substituting tetraethyl orthosilicate in the same molar proportions for the ethyl polysilicate.

It is to be understood that the following claims constitute a part of the description of the present invention and consequently are to be considered such.

What is claimed is:

1. An essentially anhydrous bonding liquid useful for bonding refractories in moulds comprising an admixture of
    (a) an acidic aqueous colloidal silica sol having a silica concentration, based on the total weight of the sol, of from about 39 weight percent to about 60 weight percent, a water concentration, based on the total weight of the sol, of from about 40 weight percent to about 61 weight percent, having a pH of from about 0.5 to about 1.5 at 25° C., having a normality of from about 0.05 to about 0.23 and being present in said bonding liquid in an amount to provide from about 18 weight percent to about 44 weight percent of the total silica present in said bonding liquid;
    (b) a water miscible organic solvent in an amount of from about 38 weight percent to about 70 weight percent based on the total weight of the bonding liquid; and
    (c) an alkyl silicate or mixtures thereof having a structural formula

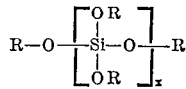

where R is an alkyl radical from 1 to 4 carbon atoms and $x$ is a number from 1 to 10, said alkyl silicate having a silica content, based on the total weight of said silicate, of from about 20 weight percent to about 45 weight percent, said silicate being present in said bonding liquid in an amount to provide from about 56 weight percent to about 82 weight percent of the total silica in said bonding liquid;
said bonding liquid being stable towards gelation for at least 60 days at a temperature of 25° C., containing silica in an amount of from about 10 weight percent to about 25 weight percent, based on the total weight of the bonding liquid, containing acid from said acidic aqueous colloidal silica sol to provide a normality of the bonding liquid of about 0.003 to about 0.05, containing a total water miscible organic solvent concentration in an amount from about 75 weight percent to about 90 weight percent, based on the total weight of the bonding liquid, containing water in an amount less than about 5 weight percent, based on the total weight of the bonding liquid and having an average silica surface area of about 800 to about 1200 sq. meters/gram.

2. A bonding liquid according to claim 1 wherein
    (a) said acidic aqueous colloidal silica sol is present in an amount to provide from about 19 weight percent to about 33 weight percent of the total silica present in said bonding liquid;
    (b) said water miscible organic solvent is present in an amount from about 50 weight percent to about 60 weight percent, based on the total weight of the bonding liquid;
    (c) said alkyl silicate is present in an amount to provide from about 56 weight percent to about 70 weight percent of the total silica present in said bonding liquid;
said bonding liquid containing silica in an amount of from about 15 weight percent to about 20 weight percent, based on the total weight of the bonding liquid, containing acid from said acidic aqueous colloidal silica sol to provide a normality of about 0.005 to about 0.02, containing said total water miscible organic solvent concentration in an amount of from about 80 weight percent to about 85 weight percent, based on the total weight of the bonding liquid, and containing less than about 1 weight percent of water based on the total weight of the bonding liquid.

3. A composition according to claim 2, wherein said water miscible organic solvent is selected from the group consisting of ethyl alcohol, isopropanol and methanol all being anhydrous.

4. A composition according to claim 3, wherein said alkyl silicate has a silica concentration of from about 38 weight percent to about 42 weight percent, based on the total weight of said alkyl silicate.

5. A composition according to claim 4, wherein said alkyl silicate is a liquid ethyl polysilicate having 90 weight percent to about 95 weight percent of polymers having 5 ot 6 —Si—O— groups per molecule with the balance being made up of other species having 1 to 8 —Si—O— groups per molecule, and said silicate having less than 1 weight percent of free alcohol, and a silica surface area of 1400 sq. meters/gram when completely hydrolyzed.

6. A bonding liquid according to claim 5 wherein said acidic aqueous colloidal silica sol has a silica concentration based on the total weight of the sol of from about 45 weight percent to about 55 weight percent, a water concentration based on the total weight of the sol, of from about 55 weight percent to about 60 weight percent, an ultimate particle size of from about 5 to about 50 millimicrons, and a silica surface area of about 60 to 160 sq. meters/gram.

7. An essentially anhydrous bonding liquid useful for bonding refractories in moulds comprising an admixture of
    (a) an acidic organo-aqueous colloidal silica sol having
        a silica concentration, based on the total weight of the sol, of from about 2 weight percent to about 17 weight percent, a water concentration based on the total weight of the sol, of from about 2 weight percent to about 41 weight percent, a water miscible organic solvent concentration, based on the total weight of the sol, of from about 57 weight percent to about 96 weight percent,
        a normality of from about 0.005 to about 0.023, said sol being present in said bonding liquid to provide from about 18 weight percent to about 44 weight percent of the total silica present in said bonding liquid; and
    (b) an alkyl silicate or mixtures thereof, having a structural formula

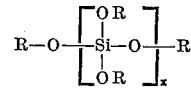

where R is an alkyl radical from 1 to 4 carbon atoms and $x$ is a number from 1 to 10, said alkyl silicate having a silica content based on the total weight of said silica of from about 20 weight percent to about 45 weight percent, said silicate being present in said bonding liquid in an amount to provide from about 56 weight percent to about 82 weight percent of the total silica in said bonding liquid,
said bonding liquid being stable towards gelation for at least 60 days at a temperature of 25° C., containing silcia in an amount of from about 10 weight percent to about 25 weight percent, based on the total weight of the bonding liquid, containing free acid from said acidic organo-aqueous colloidal silica sol to provide a normality of about 0.003 to about 0.05, containing a total water miscible organic solvent concentration in an amount from about 75 weight percent to about 90 weight percent based on the total weight of the bonding liquid, containing water in an amount less than about 5 weight percent, based on the total weight of the bonding liquid and the silica having an average surface area of about 800 to about 1200 sq. meters per gram.

8. A composition according to claim 7 wherein
(a) said acidic organo-aqueous colloidal silica sol has a silica concentration of about 4 weight percent to about 10 weight percent, based on the total weight of the sol, a water concentration of from about 6 weight percent to about 21 weight percent, based on the total weight of the sol, a water miscible organic solvent concentration of about 75 weight percent to about 90 weight percent, based on the total weight of the sol and being present in said bonding liquid to provide from about 19 weight percent to about 33 weight percent of the total silica present in said bonding liquid; and
(b) said alkyl silicate is present in an amount to provide from about 56 weight percent to about 70 weight percent of the total silica present in said bonding liquid,
said bonding liquid containing silica in an amount of from about 15 weight percent to about 20 weight percent, based on the total weight of the bonding liquid, containing free acid from said acidic organo-aqueous colloidal silica sol to provide a normality from about 0.005 to about 0.02, having a total water miscible organic solvent concentration of from about 80 weight percent to about 85 weight percent, based on the total weight of the bonding liquid, and containing less than about 1 weight percent of water based on the weight of the bonding liquid.

9. A bonding liquid according to claim 8 wherein said water miscible organic solvent of said acidic organo-aqueous colloidal silica sol is anhydrous ethanol.

10. A composition according to claim 9 wherein said alkyl silicate has a silica concentration of from about 38 weight percent to about 42 weight percent, based on the total weight of said alkyl silicate and wherein said alkyl silicate is a liquid ethyl polysilicate having 90 weight percent to about 95 weight percent of polymers having 5 to 6 —Si—O— groups per molecule with the balance being made up of other species having 1 to 8 —Si—O— groups per molcule, said silicate having less than 1 weight percent of free alcohol.

11. A process for preparing an essentially anhydrous bonding liquid which comprises:
(1) acidifying an alkaline aqueous colloidal silica sol with a mineral acid, said alkaline sol having a pH above 7 at 25° C., a silica concentration, based on the total weight of the sol, of about 39 weight percent to about 60 weight percent, a water concentration, based on the total weight of the sol, of from about 40 weight percent to about 60 weight percent, said sol being present in an amount to provide from about 18 weight percent to about 44 weight percent of the total silica in said bonding liquid, said acid being present in an amount to provide a normality of said acidified aqueous colloidal silica sol of about 0.05 to about 0.23;
(2) combining to form a mixture the acidic aqueous colloidal silica sol and a water-miscible organic solvent, said solvent used in an amount of from about 38 weight percent to about 70 weight percent based on the total weight of the bonding liquid;
(3) combining an alkyl silicate or mixtures thereof with the mixture of acidic aqueous colloidal silica sol and a water-miscible organic solvent obtained in step (2), said alkyl silicate having the structural formula:

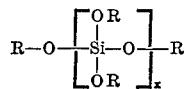

where R is an alkyl radical from 1 to 4 carbon atoms and $x$ is a number from 1 to 10, said alkyl silicate having a silica content based on the total weight of the silicate of about 20 weight percent to about 45 weight percent, said alkyl silicate being present in an amount to provide from about 56 weight percent to about 82 weight percent of the total silica in said bonding liquid;
whereby a bonding liquid is prepared having a homogeneous liquid phase with colloidal silica dispersed therein, said bonding liquid being stable toward gelation for at least 60 days at a temperature of 25° C., containing silica in an amount of from about 10 weight percent to about 25 weight percent, based on the total weight of the bonding liquid, containing acid from said acidic aqueous colloidal silica sol to provide a normality of the bonding liquid of about 0.003 to about 0.05, containing a total water-miscible organic solvent concentration in an amount of from about 75 weight percent to about 90 weight percent, based on the total weight of the bonding liquid, containing water in an amount less than about 5 weight percent, based on the total weight of the bonding liquid and having an average silica surface area of about 800 to about 1,200 sq. meters/gram.

12. A process according to claim 11, wherein
(1) said mineral acid is selected from the group consisting of hydrochloric and sulfuric;
(2) said water-miscible organic solvent is selected from the group consisting of anhydrous ethanol, anhydrous isopropanol and anhydrous methanol; and
(3) wherein said alkyl silicate is a liquid polyethyl silicate, having 90 weight percent to about 95 weight percent of polymers having five to six —Si—O— groups per molecule with the balance being made up of other species having one to eight —Si—O— groups per molecule and containing about 38 weight percent to about 42 weight percent based on the total weight of the silicate, with the balance being made up of ethoxy groups, oxygen, and less than 1% ethanol.

13. A process according to claim 11, wherein
(1) said mineral acid is added to said water-miscible organic solvent to form a solution; and
(2) wherein said solution is added to said alkaline aqueous colloidal silica sol so that the normality of this mixture is in the range of from about 0.005 to about 0.023.

14. A process for preparing an essentially anhydrous bonding liquid which comprises combining:
(1) an acidic organo-aqueous colloidal silica sol, said sol having a silica concentration of about 2 weight percent to about 17 weight percent, a water miscible organic solvent concentration of about 57 weight percent to about 96 weight percent, a water concentration from about 2 weight percent to about 41 weight percent, all concentrations based on the total weight of the sol, and a normality of from about .005 to about 0.023; said sol being present in an amount to provide from about 18 weight percent to about 44 weight percent of the total silica in said bonding liquid;
(2) an alkyl silicate or mixtures thereof, having a structural formula:

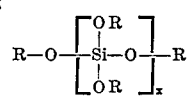

where R is an alkyl radical from 1 to 4 carbon atoms and $x$ is a number from 1 to 10, said alkyl silicate having a silica content based on the total weight of said sol from about 20 weight percent to about 45 weight percent, said silicate being present in an amount to provide from about 56 weight percent to about 82 weight percent of the total silica in said bonding liquid;
whereby an essentially anhydrous bonding liquid having colloidal silica dispersed in a homogeneous liquid phase is prepared, said bonding liquid is stable toward gelation or settling for at least 60 days at temperatures of 25° C., containing silica in an amount of from about 10 weight percent to about 25 weight percent, based on the total weight of the bonding liquid, containing sufficient acid to provide a normality of about 0.003 to about 0.05, containing a total solvent concentration in an amount from about 75 weight percent to about 90 weight percent based on the total weight of the bonding liquid, containing less than about 5 weight percent of water, based on the total weight of the bonding liquid and having an average silica surface area from about 800 to about 1200 sq. meters/gram.

15. An essentially anhydrous bonding liquid which comprises:
   (1) from about 10 weight percent to about 25 weight percent, based on the total weight of the bonding liquid, of colloidal silica having an average surface area of 800 to 1200 sq. meters/gram, about 18 weight percent to about 44 weight percent of said colloidal silica having an average surface area of about 60 sq. meters to about 400 sq. meters/gram, 56 weight percent to about 82 weight percent of said silica having a surface area of about 1400 sq. meters/gram;
   (2) a water miscible organic solvent in an amount of from about 75 weight percent to about 90 weight percent, based on the weight of the bonding liquid;
   (3) acid present in an amount to provide a normality of about 0.003 to about 0.05; and
   (4) less than about 5 weight percent of water, based on the weight of the bonding liquid.

16. A bonding liquid according to claim 15, wherein
   (1) said silica is present in an amount of from about 15 weight percent to about 20 weight percent, about 19 weight percent to about 33 weight percent of said colloidal silica has an average surface area of about 60 sq. meters to about 400 sq. meters/gram, about 56 weight percent to about 70 weight percent of said silica has a surface area of about 1400 sq. meters/gram;
   (2) said organic solvent is present in an amount of about 80 weight percent to about 85 weight percent, based on the weight of the bonding liquid;
   (3) said acid is present in an amount to provide a normality of about 0.005 to about 0.02; and
   (4) said water is present in an amount less than 1 weight percent, based on the weight of the bonding liquid.

17. A bonding liquid according to claim 16, wherein
   (1) said water miscible organic solvent is selected from the group consisting of anhydrous ethanol, anhydrous methanol, anhydrous propanol, and anhydrous isopropanol; and
   (2) said acid is selected from the group consisting of hydrochloric acid and sulfuric acid.

References Cited
UNITED STATES PATENTS 2,842,445   7/1958   Emblem et al. _____ 106—38.35

LORENZO B. HAYES, Primary Examiner

U.S. Cl. X.R.

106—38.3, 28.7; 252—309, 313

PO-1050
(5/69)

UNITED STATES PATENT OFFICE
CERTIFICATE OF CORRECTION

Patent No. 3576652            Dated April 27, 1971

Inventor(s) Harry Teicher and Ralph Marotta

It is certified that error appears in the above-identified patent and that said Letters Patent are hereby corrected as shown below:

Harry Teicher and Ralph Marotta, St. Louis, Mo., assignors to Monsanto Company, St. Louis, Mo., a corporation of Delaware.

Signed and sealed this 12th day of October 1971.

(SEAL)
Attest:

EDWARD M. FLETCHER, JR.          ROBERT GOTTSCHALK
Attesting Officer                 Acting Commissioner of Pat